UNITED STATES PATENT OFFICE.

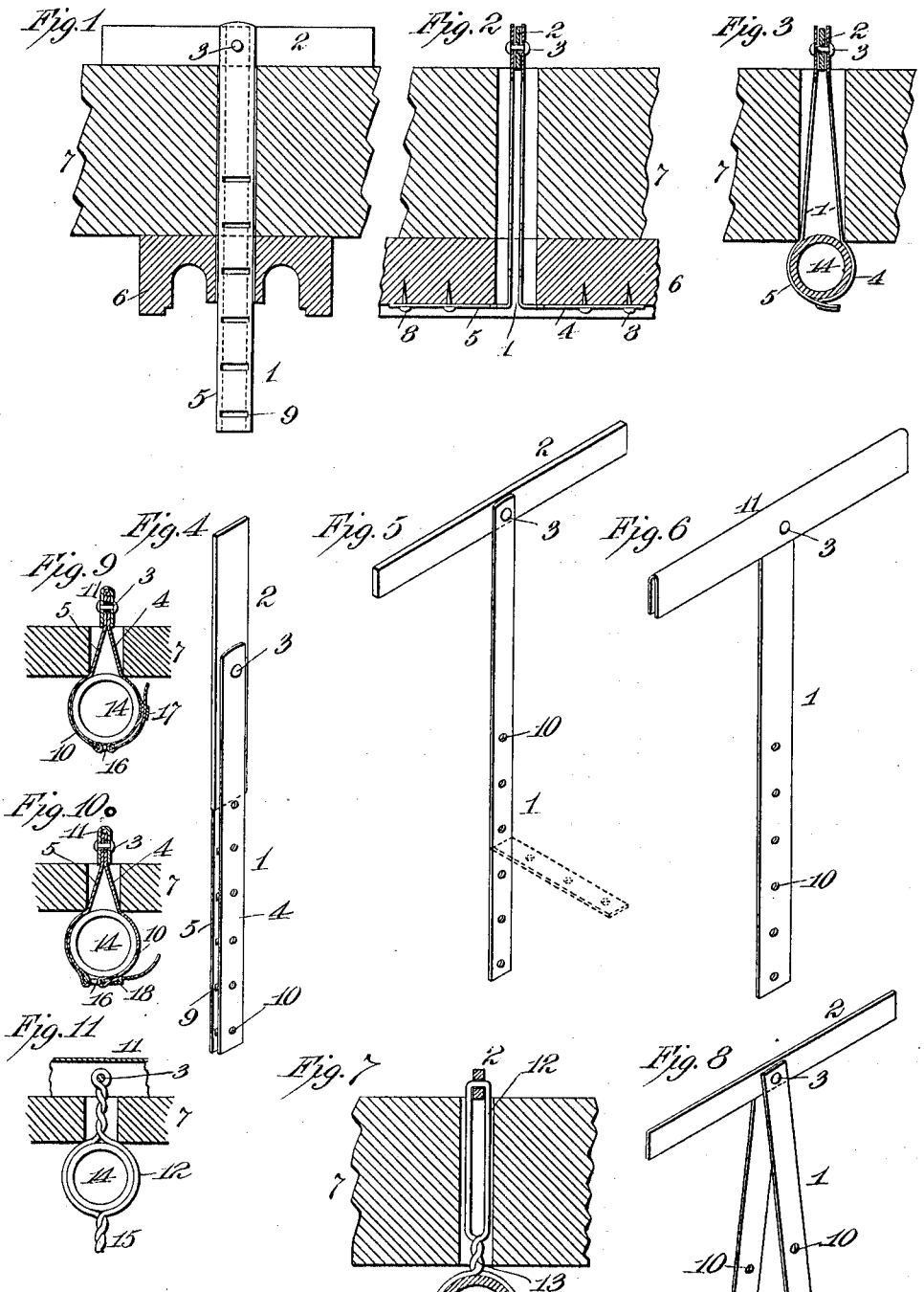

FREDERICK JENSEN, OF ALDENE, NEW JERSEY, DAVID CONLAN, JR., OF NEW YORK, N. Y., AND LEONARD H. DYER, OF GREENWICH, CONNECTICUT, ASSIGNORS, BY DIRECT AND MESNE ASSIGNMENTS, TO ELIZABETH CONLAN, OF BROOKLYN, NEW YORK.

SUPPORTING DEVICE.

1,040,341.  Specification of Letters Patent.  Patented Oct. 8, 1912.

Application filed April 8, 1908. Serial No. 425,822.

*To all whom it may concern:*

Be it known that we, FREDERICK JENSEN, a citizen of the United States, a resident of Aldene, Roselle Park, Union county, State of New Jersey, DAVID CONLAN, Jr., of the borough of Manhattan, city, county, and State of New York, and LEONARD H. DYER, of Greenwich, county of Fairfield, State of Connecticut, have invented a new and useful Supporting Device, of which the following is a specification.

The objects we have in view are the production of a device particularly applicable for the attachment of molding and conduits used in electric installation to ceilings and walls.

The particular objects are to produce a device, of which the first cost will be small, which may be attached in position with a minimum amount of labor, which will not interfere with the electric connections, and which will adequately sustain the supported device.

These and further objects will appear from consideration of the embodiments of our invention set forth in this specification and in the accompanying drawings, in which—

Figure 1 is an end elevation of a device embodying our invention showing a portion of the wall or ceiling and a molding in cross-section; Fig. 2 is a view of the same device illustrated in Fig. 1, at right angles thereto, and with the molding permanently secured in position. Fig. 3 is a view of the device illustrated in Figs. 1 and 2, but shown as supporting a conduit. Fig. 4 is a perspective view of the same device. Fig. 5 is a perspective view of a modification. Fig. 6 is a perspective view of another modification. Fig. 7 is a view partly in section, of a modified form of the invention, applied to a conduit. Fig. 8 is a detail view of another modification. Figs. 9, 10 and 11 are details of modifications.

In all of the views like parts are designated by the same reference characters.

Our device comprises a stem 1 and a head 2; the stem is pivotally connected to the head, so that the head may be swung in line with the stem and introduced through an opening. Upon turning the head at right angles with the stem it will hold the device in position. The head is preferably in the form of a bar, as illustrated, formed of a single piece of metal. The connection between the stem and the head may be made by means of a bolt or rivet 3. The stem 1 is pliant and, according to one form of our invention, is made of a plurality of parts.

In the embodiments illustrated in Figs. 1, 2, 3, 4 and 8, the stem is made of two parts, each preferably of pliant sheet metal of the proper width and thickness. In the device illustrated in Figs. 1, 2, 3 and 4, the portions of the stem are the strips 4 and 5. These strips are connected one on each side of the head, and are secured together and to the head by means of the bolt or rivet 3. When the device is introduced through the hole, the head is turned in line with the strips, as shown in Fig. 4, so that the device may be introduced through the hole. When the device is used for supporting a molding 6 to the wall or ceiling 7, a hole is bored through molding and ceiling, and the device is introduced through such hole, as shown. The stem 1 of the device is sufficiently long that when the head is introduced through the hole, and has been caused to assume the position illustrated in Fig. 2, the lower ends of the stem will extend down a sufficient distance beyond the molding to be separated and bent apart, as shown in Fig. 2. These separated portions of the stem may be secured to the molding by tacks 8, passed through suitable openings in the strips. These strips are best made of pliant material which is capable of bending at the sharp angle necessary in order to permit their ends to lie fairly within the molding.

When the device is to be used for supporting conduit pipes, as shown in Fig. 3, an opening is made through the wall or ceiling, and the pipe is supported between the two strips constituting the stem of the supporting device, the strips being secured together, grasping the pipe and holding it against the wall or ceiling. A satisfactory means for securing the two strips together is illustrated in Figs. 1 and 4, which means comprises a series of openings 9 formed in the strip 5. In this embodiment of the invention the openings are in the form of slots. The strip 4 is shown as narrower than the strip 5, and is of the same width as the width of the slots 9. The strip 4 may therefore be threaded through one of the slots 9, as shown in Fig. 3, tightly embracing the conduit, and the end of the strip 4 is then bent over and back, to hold the parts in position, as shown. These slots 9 may be utilized as openings for the tacks 8 when the device is used as shown in Fig. 2. To permit the tacks to be introduced through the strip 4, a series of holes 10 may be made in such strip. A plurality of slots 9 and holes 10 is best used to adapt the device to walls and supported objects of varying thickness.

Our device may be modified in many ways. In Fig. 5 the stem 1 is made of a single pliant strip like the strip 4, illustrated in Fig. 4. A single strip may be used for supporting the molding, in the manner illustrated in Figs. 1 and 2, such strip being bent to one side and secured to the molding by tacks or other fastenings. In Fig. 6 is shown another modification, in which the head is in the form of a longitudinally bent strip 11, the bend being U-shaped, and the stem 1 being introduced between the legs of the U, and secured in position by the molt or rivet 3. Fig. 8 shows a device very similar to that shown in Fig. 4, but without the slots 9, and with both of the strips of the same width, which device may be used for supporting the molding in the manner illustrated in Figs. 1 and 2.

In the modification illustrated in Fig. 9, the two pliant strips 4 and 5 are adapted to be connected together to support a conduit 14, by means of a buckle 16. This buckle is in the form of a link or ring, the strip 5 passing through the link from outside inwardly, and being tucked under itself. The strip 4 passes through the buckle from inside outwardly, and its free end is retained by means of a loop 17. In the structure illustrated in Fig. 10 the buckle 16 carries a loop 18 for retaining the free end of the strip. In both structures illustrated in Figs. 9 and 10 the strips are perforated, so that the device may be used for supporting moldings.

Fig. 7 shows a modified embodiment of the invention for supporting conduits. In this case the stem is formed of a wire 12, which passes through an opening in the center of the head 2, permitting the head to pivot upon the wire. The wire may be twisted together at 13, at the proper distance from the head, and the conduit 14 may be introduced between the two wires, and their free ends twisted together at 15. In the modification illustrated in Fig. 11 the wire 12 is secured to the form of head illustrated in Fig. 6 by means of a pivot 3.

We have illustrated our invention in connection with the form of supporting device which has a pivoted head. It is to be understood that such head is shown solely for the purposes of illustration, as any other head or other device for sustaining the bolt within the base or wall 7 may be employed.

It will be apparent from this description of our invention that we have produced a device which may be very cheaply manufactured, and which may be applied with great ease and with little labor. It will be noted that the stem of the device is pliant; therefore, when applying molding to a ceiling or wall, the holes through the molding and walls do not exactly have to coincide. It is also apparent that the opening through the wall or ceiling may be made at an angle to the opening through the molding which will not affect the efficient operation and easy application of the device. It is also apparent that the device may be made very cheaply and that it will, when in use, firmly and strongly support a molding or conduit, or any other device from a wall or ceiling. The making of the stem or flat strips, as shown and described, permits the device, when used in connection with moldings, to occupy the minimum space, as illustrated in Figs. 1 and 2. The capping may be placed upon the molding without need of cutting away any portion of the capping or countersinking any part of the molding. The device, therefore, is much more easily attached than the ordinary form of toggle bolts, which are neither flexible nor cheap. Furthermore, such bolts require washers and nuts to be properly set up, which entails cutting away of the molding or capping, and the provision of special insulation at the point where the bolt comes through.

In the specification and claims, by the term "stem" we mean that portion of the device or structure which passes through the opening in the wall or ceiling 7 or equivalent structures, as distinguished from a device or structure which is beyond the face of the wall or ceiling; and by the term "pliant" we mean capable of being bent, without breaking.

In accordance with the provisions of the patent statutes, we have described the principle of our invention, together with the apparatus which we now consider to represent the best embodiment thereof, but we desire to have it understood that the apparatus shown is merely illustrative and that the invention can be carried out in other ways.

Having now described our invention, what we claim as new and desire to secure by Letters Patent, is:

1. A toggle bolt having a cross head which engages with the inside of a support, and a pliant stem pivoted to the head and passing through an opening in the support and distortable to engage with the supported object irrespective of its shape to hold it in engagement with the outside of the support.

2. A toggle bolt having a cross head and a pliant stem portion pivoted to the head, the pliant stem portion being formed of a plurality of parts distortable for attachment to the supported object irrespective of its shape.

3. A toggle bolt formed of a stem of two pliant strips and a toggle head pivoted at one end thereof, the strips being perforated, one of the said strips being narrower than the other and of less width than the perforations in such wider strip so as to be capable of entering the perforations.

4. A toggle bolt which has a stem formed of two pliant strips which are pivoted adjacent to one of their ends to a swinging cross head, the said strips being perforated.

5. A toggle bolt which has a stem formed of two pliant strips pivoted adjacent to one of their ends to a swinging cross head, the said strips being distortable and mutually engageable to sustain the supported object.

6. A toggle bolt having a stem which comprises two pliant strips pivoted adjacent to one of the ends to a swinging cross head, one of such strips being wider than the other and having transverse slots of greater length than the width of the narrower strip to enable the narrow strip to enter a perforation.

7. A toggle bolt which comprises a stem formed of two pliant flat strips pivoted adjacent to one of their ends to a swinging cross head, the said strips being perforated and capable of being separated and bent to engage with the supported object.

8. A toggle bolt having a stem which comprises two pliant flat strips in combination with a swinging cross head, and a pivot connecting such head and strips, the portion of the strips removed from the pivot being perforated.

9. A fastening device having a member which engages with the inside of the support and a pliant stem which passes through an opening in the support and is distortable to engage with the supported object irrespective of its shape to hold it in engagement with the outside of the support.

10. A fastening device having a member which engages at one side of the support, and a pliant stem which passes through an opening in the support and is distortable to engage with the supported object irrespective of its shape to hold it against the other side of the support.

This specification signed and witnessed this 4th day of April, 1908.

FREDERICK JENSEN.
DAVID CONLAN, Jr.
LEONARD H. DYER.

Witnesses:
JOHN L. LOTSCH,
MINNIE HORMEL.